A. W. UTTERBACK.
Mechanical Movement.
No. 204,462. Patented June 4, 1878.
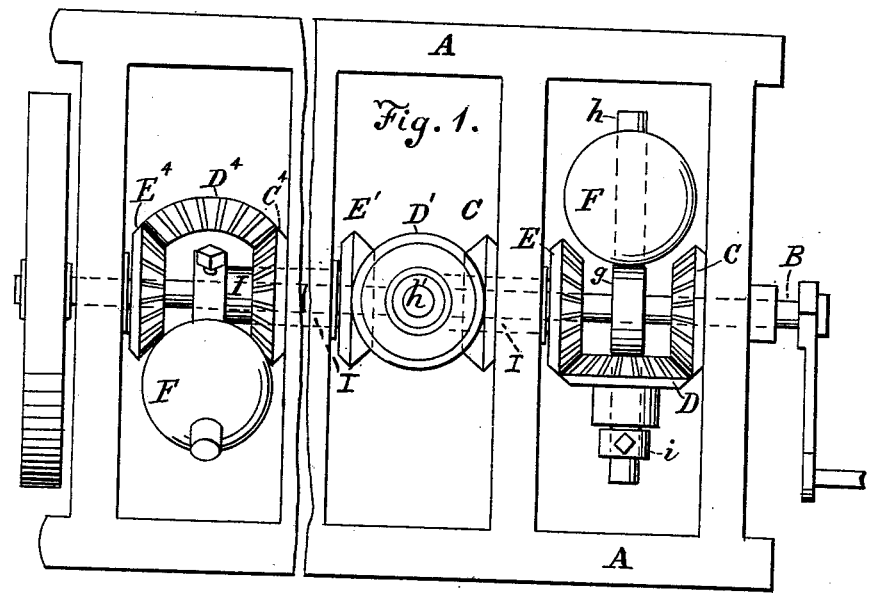
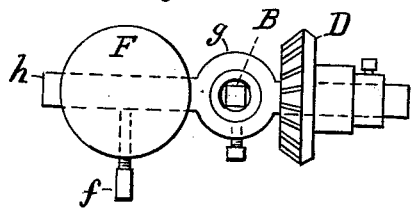

UNITED STATES PATENT OFFICE.

ARTHUR W. UTTERBACK, OF RAPPAHANNOCK COUNTY, VIRGINIA.

IMPROVEMENT IN MECHANICAL MOVEMENTS.

Specification forming part of Letters Patent No. 204,462, dated June 4, 1878; application filed May 1, 1878.

*To all whom it may concern:*

Be it known that I, ARTHUR W. UTTERBACK, of the county of Rappahannock and State of Virginia, have invented certain new and useful Improvements in Mechanical Movements; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a plan view of a machine embodying my invention, and Fig. 2 is a detached view of the counter-balance and its opposing gear-wheel.

This invention relates to an improvement in mechanical movements for increasing the speed of band-wheels, &c.; and consists of a fixed miter-wheel and revolving miter-wheel, having teeth on their adjacent faces, mounted upon a driving-shaft, and connected by a revolving miter-wheel, mounted upon one end of an arm secured to the driving-shaft between the miter-wheels upon said driving-shaft, said miter-wheel being for the purpose of producing an increase of speed.

It further consists in connecting a series of sets of wheels of uniform size upon a single driving-shaft, in such a manner that the speed of the revolving miter-wheel in each successive set will be increased in the same ratio as the terms of a geometrical progression, all of which will be hereinafter more fully described, and particularly pointed out in the claim.

In the accompanying drawing, similar letters of reference indicate like parts of the invention.

A frame-work, A, has the miter-wheels C $C^1$ $C^4$ fixed in cross-beams in the same; and the driving-shaft B is passed through and supported by the fixed miter-wheels C $C^1$ $C^4$, and supporting the revolving miter-wheels E $E^1$ $E^4$, one end of said shaft B having in this instance a crank, and the other end a band or balance wheel.

Between the miter-wheels C and E is an arm, $h$, fastened to the driving-shaft B, revolving therewith, and carrying on one end a revolving miter-wheel, D, held in place by a collar, $i$, and on the other end a counter-balance, F, held by a set-screw, $f$.

The teeth of the miter-wheel D engage with the teeth of the fixed miter-wheel C, and also with those of the revolving miter-wheel E, and, as the crank is revolved one revolution, it carries the arm $h$, and with it the miter-wheel D, one revolution, causing the wheel E to make one revolution on that account, and also producing a second revolution of the said wheel E during the time of this revolution, by reason of the fact that the mitre-wheel D is caused to make one revolution on its axis $h$, so that the wheel D, in traveling once around the wheel C, causes two revolutions of the wheel E.

The wheel E has a sleeve, I, (shown by dotted lines in drawing,) connecting it with $C^1$, and extending a sufficient distance beyond the same to permit it to be fastened to it, so that it will revolve with it.

The wheel $C^1$ is stationary, and the wheel $D^1$, in traveling once around it, causes two revolutions of the wheel $E^1$; and as the arm $h^1$ revolves as often as the wheel E, to the sleeve of which it is attached, and said wheel E revolving twice as fast as the arm $h$, the wheel E revolves four revolutions while the shaft B and arm $h$, to which it is fastened, revolve once, so that each additional set of gearing added will increase the speed in the same ratio as the terms of a geometrical progression—viz., 1, 2, 4, 8, 16, 32, &c.; and, of course, the speed will be decreased in a like manner when the power is applied to the band-wheel.

I do not claim, broadly, the arrangement, as shown in the Entwistle Patent No. 57,693, of a miter-gear revolving between two other miter-gears of equal size, one fixed and the other free, for the purpose of increasing the speed of the latter.

Having thus described my invention, what I claim as new and useful, and desire to secure by Letters Patent of the United States, is—

The fixed miter-wheel C and the revolving miter-wheel E, having the driving-shaft B passed through them, and connected by the revolving miter-wheel D, placed upon one end of the arm $h$ and counterbalanced by the adjustable weight F, constructed and operating substantially as and for the purpose set forth.

In testimony that I claim the foregoing as my own I hereby affix my signature in presence of two witnesses.

A. W. UTTERBACK.

Witnesses:
    Jos. T. K. Plant,
    Y. W. Plant.